(12) United States Patent
Shembel et al.

(10) Patent No.: US 7,351,502 B2
(45) Date of Patent: Apr. 1, 2008

(54) SOLID INORGANIC GLASSY ELECTROLYTE AND METHOD OF PRODUCTION THEREOF

(75) Inventors: Elena Shembel, Coral Springs, FL (US); Alexander Nosenko, Dnipropertovsk (UA); Andrey Kvasha, Dnipropetrovsk (UA); Peter Novak, Fort Lauderdale, FL (US)

(73) Assignee: Enerize Corporation, Coral Springs, FL (US)

( * ) Notice: Subject to any disclaimer, the term of this patent is extended or adjusted under 35 U.S.C. 154(b) by 561 days.

(21) Appl. No.: 10/898,134

(22) Filed: Jul. 23, 2004

(65) Prior Publication Data
US 2005/0147890 A1   Jul. 7, 2005

(51) Int. Cl.
*H01M 10/36* (2006.01)
*C03C 4/18* (2006.01)

(52) U.S. Cl. ......................................... 429/322; 501/49

(58) Field of Classification Search ................ 429/322; 501/49
See application file for complete search history.

(56) References Cited

U.S. PATENT DOCUMENTS

| | | | |
|---|---|---|---|
| 3,776,745 A * | 12/1973 | Trap .............................. | 501/49 |
| 3,911,083 A | 10/1975 | Reed et al. | |
| 4,184,015 A | 1/1980 | Reau et al. | |
| 4,717,690 A * | 1/1988 | Hankey et al. ........... | 501/49 X |
| 7,273,682 B2 * | 9/2007 | Park et al. .................. | 429/322 |

* cited by examiner

*Primary Examiner*—Stephen J. Kalafut

(57) ABSTRACT

Solid electrolytes of the composition: $60L_2O \cdot 15Li_2SO_4 \cdot 25B_2O_3$; $65L_2O \cdot 10Li_2SO_4 \cdot 25B_2O_3$; $65L_2O \cdot 15Li_2SO_4 \cdot 20B_2O_3$; $60L_2O \cdot 20Li_2SO_4 \cdot 20B_2O_3$; $59,55L_2O \cdot 19,85Li_2SO_4 \cdot 19,85B_2O_3 \cdot 0,75MoO_3$, characterized by the high level of productivity, high ionic conductivity, negligible low level of electronic conductivity and resistance to metal lithium suitable for use in primary and rechargeable lithium power sources.

9 Claims, 2 Drawing Sheets

SOLID INORGANIC GLASSY ELECTROLYTE AND METHOD OF PRODUCTION THEREOF

CROSS-REFERENCE TO RELATED APPLICATIONS

This application claims the benefit of Ukrainian Application No. 2003077008 filed on Jul. 25, 2003, the entirety of which is incorporated herein by reference.

STATEMENT REGARDING FEDERALLY SPONSORED RESEARCH OR DEVELOPMENT

Not applicable.

FIELD OF THE INVENTION

This invention relates to the field of high energy chemical power sources, particularly to the compositions of lithium-comprising viothreous materials used as solid electrolytes of lithium chemical power sources (CPS) operational at room temperature.

BACKGROUND OF THE INVENTION

Lithium CPS have a number of the qualities advantageously differing them from traditional power sources. They are characterized by the increased values of discharge voltage (from 1.5 up to 4.5 V), high specific energy power characteristics, long life, long time of storage and wide operation temperature ranger. Specific characteristics of lithium CPS calculated by thermodynamic method reach more 1000 $(W \cdot h) \cdot kg^{-1}$.

In spite of the successes in the development and numerous advantages in lithium CPS it became necessary to increase the efficiency of their work. In particular, at this moment, the problem concerning lithium dendritic growth and capacity loss at lithium electrode cycling is still unsolved.

Use of solid inorganic electrolytes (SE) will enable design of new generation lithium (CPS) with the possibility of safe redischarging, temperature range widening and new standard sizes. At the given moment a great number of SE is recognized for application in lithium CPS.

Lithium secondary power sources with a solid electrolyte have essential advantages as compared with the lithium secondary power sources with a liquid electrolyte.

The following advantages may be considered as the main ones:
- a high specific characteristics due to the possibility to use metal lithium as the anode of lithium-metal secondary batteries;
- increased safety at lithium-metal secondary battery cycling due to the absence of treeing and short circuits between cathode and anode;
- unavailability of liquid phase, and, hence, possibility of the reliable hermetic sealing of power source;
- possibility to manufacture the completely solid-phase micro batteries with the thickness up to micro units.

To realize the advantages of lithium power sources with a solid electrolyte, the latter should possess the following main properties:
- high lithium cation ionic conductivity at room temperatures;
- low electronic conductivity to avoid power source self-discharge;
- chemical stability relative to electrode materials and the products of electrochemical reactions in the process of power source discharge-charge;
- electrochemical stability in the working voltage range of power source cycling;
- possibility to produce SE as thin films (in particular, for thin film production from vitreous materials, these materials should melt and then solidify without destruction).

Goal this invention is development solid inorganic electrolyte and method of production thereof which will satisfy these requests.

High lithium ion conductivity of solid inorganic vitreous materials is determined by both the significant content of lithium oxide in their composition, and the increased values of a free volume typical of vitreous materials (especially in a hardened state).

All the materials with cation conductivity which can be used as solid electrolyte in electrochemical cells may be conventionally subdivided into crystalline and amorphous ones.

For the above aim, among crystalline materials the so-called β-alumina ($Li^2O \cdot 5A_{12}O_3$ or $Li_2O_{11}A_{12}O_3$), which conductivity is $5 \cdot 10^{-2}$ $S \cdot cm^{-1}$ at 100° C. and $5 \cdot 10^{-1}$ $S \cdot cm^{-1}$ at 300° C. is of the greatest interest. Application of β-alumina for the noted aim is limited by the difficulty connected with producing monolithic products as thin films. Primarily, it is connected with the incongruent melting character of crystalline compounds of the above composition, i.e. with their irreversible destruction at heating above melting temperature (above 1500° C., for example, at evaporation in vacuum. Besides, the above compounds are characterized by clearly expressed anisotropy. According to the literature data the mentioned conductivity values are observed only alongside axis perpendicular to the main axis of crystals, in the other directions β-alumina is characterized by considerably less conductivity.

Such crystalline compounds as $Li_2SO_4$ and $Li_2WO_4$, are also characterized by rather high values of lithium ion conductivity, however, on the judgment of the majority of investigators this concerns only the high temperature modifications of the mentioned crystals [2].

It is also known the U.S. Pat. No. 3,911,083, where oxyhalogenide crystalline cation conductors with lithium ion conductivity close to β-alumina being characterized by rather lower melting temperature are described. In particular, melting temperature of the compound corresponding to the formula $Li_4B_7O_{12}Cl$ is only 850° C., and its conductivity at 300° C. is close to 10-2 $S \cdot cm^{-1}$. Nevertheless, high conductivity of the proposed materials is reached only at high temperatures (the data concerning conductivity of such materials at room temperature are unavailable in the literature) whereas, solid electrolyte, primarily, should provide stable work in the composition of CPS at room temperature.

At present, vitreous solid electrolytes are widespread [3]. Due to the statistical distribution of structural elements in glass (glass networks) they are characterized by higher disorder degree and increased (as compared with the corresponding crystals) free volume (especially, hardened glasses). These factors promote increasing ionic conductivity of glassy materials.

All amorphous solid electrolytes described in the literature can be arbitrarily subdivided into oxygen-free (sulfide, halogenide, etc), oxygen-comprising and mixed ones.

Lithium-comprising sulfide glasses are characterized by the exclusively high values of lithium ion conductivity (according to the literary date, their conductivity reaches $10^{-4} \div 10^{-3}$ $S \cdot cm^{-1}$ at room temperature). Complex technology of their production, (in particular, synthesis of sulfide glasses can be realized either under vacuum conditions or in shielding atmosphere) is the characteristic disadvantage of such glasses. Well-known tendency of sulfides to a hydrolysis conditions their low chemical stability. Besides, at storage in air the partial oxidation of S2-cations inevitably results in increasing the electron component of such glass composition conductivity. Electrical stability of sulfide SE also causes a doubt.

Multi-lithium halogenide and oxihalogenide glasses have been investigated rather well. It is generally accepted, that introduction of lithium salts into lithium-borate glasses improves significantly their conductivity. In particular, U.S. Pat. No. 4,184,015 describes the glasses comprising $1B_2O_3 \cdot (0.57-0.85)Li_2O \cdot (0.21-0.57)LiCl$, which conductivity at 100° C. is $6.3 \cdot 10^{-6}$ -$1.1 \cdot 10^{-4}$ S·cm$^{-1}$. However, taking into account the fact that battery operation with solid electrolyte should occur at lower temperatures, one may conclude that the glasses of the above composition have insufficiently high ionic conductivity.

Solid electrolytes based on oxide glasses [2,3] have been investigated the most widely. It should be noted that oxide glasses as compared with the non-oxygen ones have the indisputable advantages—chemical and electrochemical stability. Correspondingly, they are produced directly in air. The majority of such glasses as glass-forming oxides comprises $B_2O_3$ and $P_2O_5$, i.e. is based on the glass-forming systems $Li_2O$—$B_2O_3$ and $Li_2O$—$P_2O_5$. For increasing ionic conductivity of such glasses oxygen-comprising lithium salts are included [3]. In the literature the glass including $0.4Li_2O \cdot 0.2Li_2SO_4 \cdot 0.4B_2O_3$ [4], which was used in the compositions with polyethylene oxide as CPS electrolyte is described.

In the U.S. Pat. No. 4,184,015, selected by the author as a prototype, there is information about the conductivity of the glass including $0.57Li_2O \cdot 0.29Li_2SO_4 \cdot 1B_2O_3$, which was $2 \cdot 10^{-5}$ S·cm$^{-1}$ at 100° C. However, at room temperature lithium ion conductivity of these glasses is insufficient for normal work as a solid electrolyte of CPS.

DETAILED DESCRIPTION OF THE INVENTION

Figure 1:
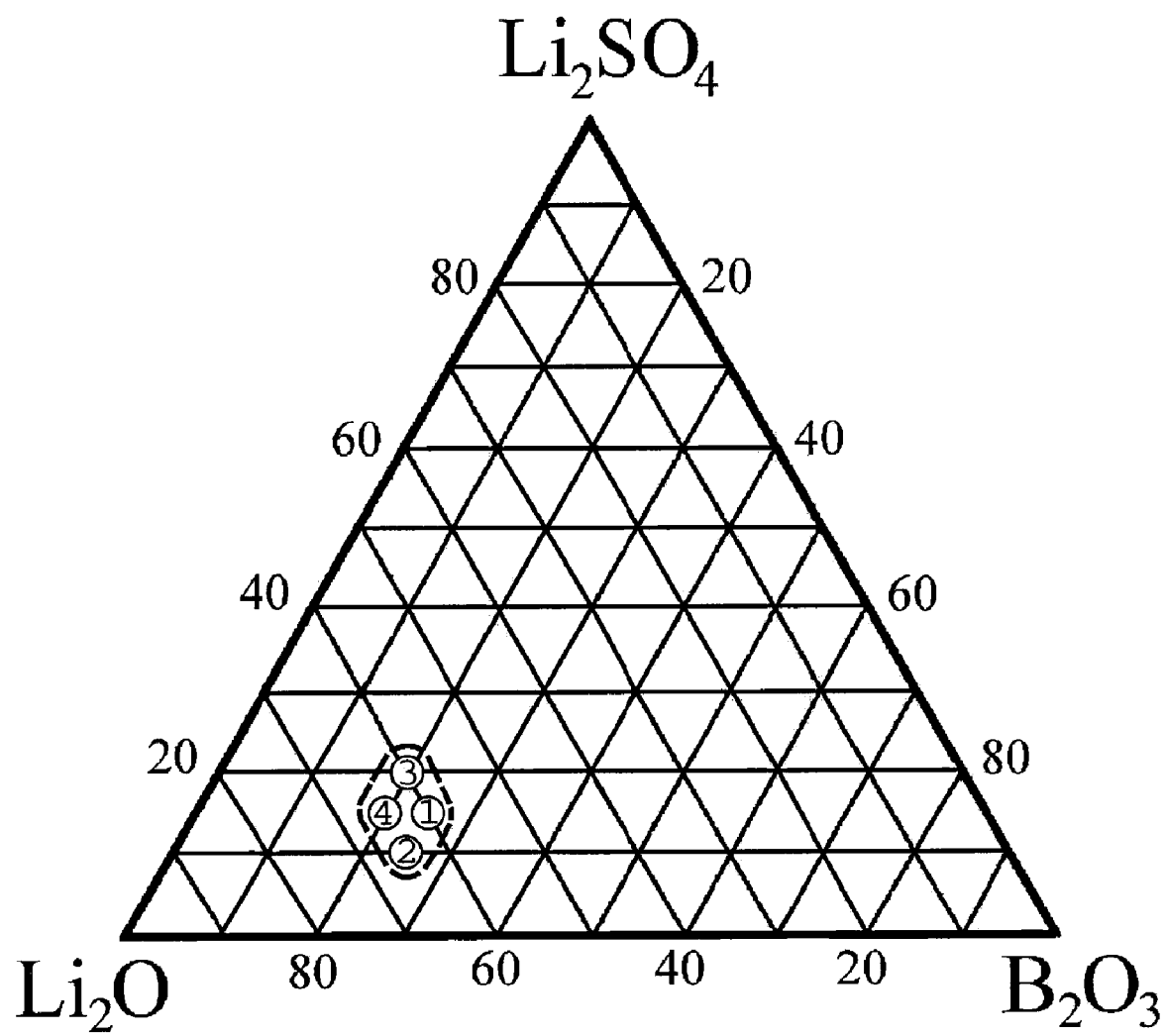
FIG. 1. Composition of SE in the multi-lithium range of the system $Li_2O$—$Li_2SO_4$—$B_2O_3$ with conductivity more than $10^{-6}$ S·cm.

The task to produce a solid vitreous inorganic electrolyte in the system $Li_2O$—$Li_2SO_4$—$B_2O_3$ with the maximum possible ionic conductivity, negligible electronic conductivity and the high workability applicable for lithium chemical power sources has been taken as a basis.

The set task is achieved at the cost of fact that solid vitreous electrolyte for lithium power sources comprising the components $Li_2O$, $Li_2SO_4$, $B_2O_3$, according to the invention, comprises the following components at their following relationships: mol. %: $Li_2O$—55-65; $Li_2SO_4$—10-25; $B_2O_3$—20-25, and also additionally $MoO_3$—0-2 mass %, being characterized by the value of ionic conductivity at 25° C. $(1.4-0.6) \cdot 10$-6 S·cm-1 and the temperature coefficient of linear expansion $(210 \pm 20)10^{-7}$ degree$^{-1}$.

Solution of the set task consists in finding the compromise: on the one hand—for increasing the ionic conductivity of SE it is necessary to increase as mach as possible the total content of lithium oxide ($Li_2O$), on the other hand—to provide vitreous state stability it was necessary to increase the content of glass-forming oxide ($B_2O_3$).

Glass formation in the multi-lithium field of the system $Li_2O$—$Li_2SO_4$—$B_2O_3$ is insufficiently studied. In accordance with the known Rowson's principle in poly-component systems, maximum tendency to glass formation is shown by the compositions arranged near eutectic points on the corresponding constitution diagrams. However, the constitution diagram of this system has not been also studied. For calculation of the composition of eutectics arranged in the multi-lithium field of $Li_2O$—$Li_2SO_4$—$B_2O_3$ systems and temperatures of their melting we have plotted liquidus lines by the formula of Shreder-Le-Shantelye in the pseudo binary systems <<$2Li_2O \cdot B_2O_3$—$Li_2SO_4$>> and <<$3Li_2O \cdot B_2O_3$—$Li_2SO_4$>>. Rightfulness of using the pseudo components $2Li_2O \cdot B_2O_3$ and $3Li_2O \cdot B_2O_3$ does not raise doubts, since these crystalline compounds are near a single in the many-lithium field of $Li_2O$—$B_2O_3$ system eutectics with melting temperature 650° C. and is characterized by low melting temperatures (650 and 715° C., respectively). Pseudocomponent $Li_2SO_4$ has been selected on the basis of our thermal dynamic calculations, which have showed the largest possibility of its formation at the thermal treatment of three-component mixtures in the system $Li_2O$—$Li_2SO_4$—$B_2O_3$.

The carried out calculations have showed that in the system <<$3Li_2O \cdot B_2O_3$—$Li_2SO_4$>> the eutectic composition with melting temperature only 508° C., comprising 65.4 mol. % $3Li_2O \cdot B_2O_3$ and 34.6 mol. % $Li_2SO_4$ is available. In the system <<$2Li_2O \cdot B_2O_3$—$Li_2SO_4$>> melting temperature of the eutectic mixture comprising 63.9 mol. % $2Li_2O \cdot B_2O_3$ and 36.1 mol. % $Li_2SO_4$, is 516° C. In terms of the components in the triple system $Li_2O$—$Li_2SO_4$—$B_2O_3$ the eutectic compositions contain. mol. %: $Li_2O$—66.2; $Li_2SO_4$—11.6; $B_2O_3$—22.1 and $Li_2O$—56.1; $Li_2SO_4$—15.8; $B_2O_3$—28.1 respectively. On the basis of the calculation results, we assumed that in the multi-lithium part of the system $Li_2O$—$Li_2SO_4$—$B_2O_3$, the range of the compositions showing the maximum tendency to glass formation is limited by the averaged composition of eutectic mixtures ±5-10 mol. % by each component, i.e. $Li_2O$—55-65 mol. %; $Li_2SO_4$—10-25 mol. %; $B_2O_3$—20-25 mol. %. The investigation results of glass formation (melting temperature: 900-950° C., melting time: –0.5 h) are presented in FIG. 1 and have been confirmed by calculations.

In particular, component concentration deviation in the experimentally established range of the most sable glass formation from the calculated data did not exceed 5 mol. %.

On the basis of the results obtained by Bikenkamp at studies of alkali borate glasses structure by the method of nuclear magnetic resonance (NMR) it may be supposed that in the glasses with such low concentration of boric anhydride practically all boron cations are in three-coordinated state. In this case, non-polar structural groups [$BO_3$] and [$SO_4$ form anion carcass of glasses, and lithium cations are connected with them only through non-bridge oxygen anions (dissociated lithium cations). Availability of lithium cations in a glass structure, predominantly in dissociated state, alongside with the increased values of free volume of glasses with such a structure have to determine the high values of lithium ion conductivity of the later.

The measurement results of the claimed glasses conductivity by the method of impedance spectroscopy within the frequency range 1-100 kHz have confirmed the suggested suppositions (Table 1).

Introduction of $MoO_3$ in the quantity up to 2 mass. % (0.75 mol. %) into the composition of glassy solid electrolyte comprising lithium oxide 66.7 mol. %, improves its cohesion with different substrates. It is interesting, that in this case its X-ray amorphism significantly increases, crystallinity decreases, ionic conductivity increases, and the level of electronic conductivity decreases. Close values of the temperature coefficient of linear expansion of vitreous electrolyte of the above composition ($\alpha=211\cdot10^{-7}$ 1/degree) and aluminum ($\alpha=220$ to $230\cdot10^{-7}$ 1/degree) allow to produce the matched seals of these materials, that using metal aluminum as the bearing elements of chemical power sources will enable avoidance of cracking and spallings in the thin films of solid electrolyte.

TABLE 1

Chemical composition of vitreous solid electrolytes in the system $Li_2O$—$Li_2SO_4$—$B_2O_3$ and their conductivity.

| No (*) | Chemical composition of solid electrolyte (gross-formula) | $\chi \cdot 10^6 \cdot S \cdot cm^{-1}$ (at 25° C.) |
|---|---|---|
| 1 | $60Li_2O \bullet 15Li_2SO_4 \bullet 25B_2O_3$ | 1.43 |
| 2 | $65Li_2O \bullet 10Li_2SO_4 \bullet 25B_2O_3$ | 2.79 |
| 3 | $60Li_2O \bullet 20Li_2SO_4 \bullet 20B_2O_3$ | 3.10 |
| 4 | $65Li_2O \bullet 15Li_2SO_4 \bullet 20B_2O_3$ | 4.90 |
| 5 | $59.55Li_2O \bullet 19.85Li_2SO_4 \bullet 19.85B_2O_3 \bullet 0.75MoO_3$ | 4.30 |

*Compositions 1-4 in accordance with FIG. 1

The claimed compositions of vitreous solid electrolytes are the optimal version of solving the problem concerning increasing ionic conductivity of glasses in the system $Li_2O$—$Li_2SO_4$—$B_2O_3$ at conservation of their technological effectiveness. I.e., minimal quantity of the traditional glass former ($B_2O_3$—20-30 mol. %), providing their good melting and manufacturing characteristics, but to a great extend decreasing lithium ion glass conductivity, included in the claimed composition. Changing the limits of component content for the claimed glasses results in sharp increasing their crystallinity or (and) deterioration of their lithium ion conductivity.

Synthesis of lithium sulfate directly at low temperature (140-160° C.) treatment of the stock comprising lithium carbonate, ammonium sulfate and boric acid is the peculiarity of the production method of the claimed glassy solid electrolytes. As it has been shown by our thermal graphic investigations, during heating up of the portion (with weight m=$0.2\div0.3$ g), containing equimolar amount of lithium carbonate and ammonium sulfate, the material without clearly defined melting endo-effect of $Li_2SO_4$ at 860-870° C. (melting temperature of lithium sulfate) is formed. In this case the walls of platinum crucible are glazed, i.e., in microamounts such mixtures even without boron anhydride has a defined glass-forming ability. During heating reactive lithium sulfate of any purity such a phenomena is not observed, and on a thermogram the defined endo-effect of $Li_2SO_4$ melting is available. The claimed glasses melted from the batch of such qualitative composition is characterized by less crystallinity, the decreased values of density, and by 1.5-2 times higher lithium ion conductivity.

As a result of glass conductivity determination in the range of the most stable glass formation it has been established that their conductivity changes in the range of $10^{-7}\div10^{-6}$ S/cm. However, for solving the set task it is necessary to use only glassy solid electrolytes with conductivity at least $10^{-6}$ S/cm.

Example 1

Glass comprising $40L_2O \cdot 30Li_2SO_4 \cdot 30B_2O_3$ (out-of-limit composition) At glass batching lithium carbonate, boric acid and ammonium sulfate (chemically pure) were used. The batch was formulated per 20 g of a glass and thoroughly stirred without wetting. Glass melting was carried out at 900-950° C., mature time—0.5 h. Glass mass stirring aimed at its homogenization was made by cavitation stirring method at the frequency 22-44 kHz. The prepared mass was formed as thin flakes by rolling method through massive water-cooled rollers. By the results of R-ray phase analysis (X PA) the X-ray amorphous material has been produced.

Conductivity of synthesized material at room temperature was $(5\div6)\cdot10^{-8}$ S·cm$^{-1}$, thermal coefficient of linear expansion—$193.3\cdot10^{-7}$ 1/degree.

Example 2

Glass of the composition $40L_2O \cdot 40Li_2SO_4 \cdot 20B_2O_3$ (out-of-limit composition). Conditions of melting and formation, production method of the samples used for determination of conductivity are similar to those of Sample 1. Visually, structure of the synthesized material is coarse-crystalline. By the results of X-ray phase analysis the produced material is strongly crystallized.

Conductivity of the synthesized glass-crystalline material at room temperature was $(1\div2)\cdot10^{-7}$ S·cm$^{-1}$. Due to a low material productivity the rest its properties have not been investigated.

Example 3

Glass of the composition $50L_2O \cdot 40Li_2SO_4 \cdot 10B_2O_3$ (out-of-limit composition). Conditions of glass melting and working, production method of the samples for conductivity determination are similar to those presented in Example 1. The melt is worked as a coarse-crystalline material, practically without glass luster. By the results of X-ray phase analysis the produced material is strongly crystallized. Conductivity of the synthesized glass-crystal material at room temperature was $(3\div4)\cdot10^{-7}$ S·cm$^{-1}$. Due to low material productivity its rest properties have not been investigated.

Example 4

Figure 2:
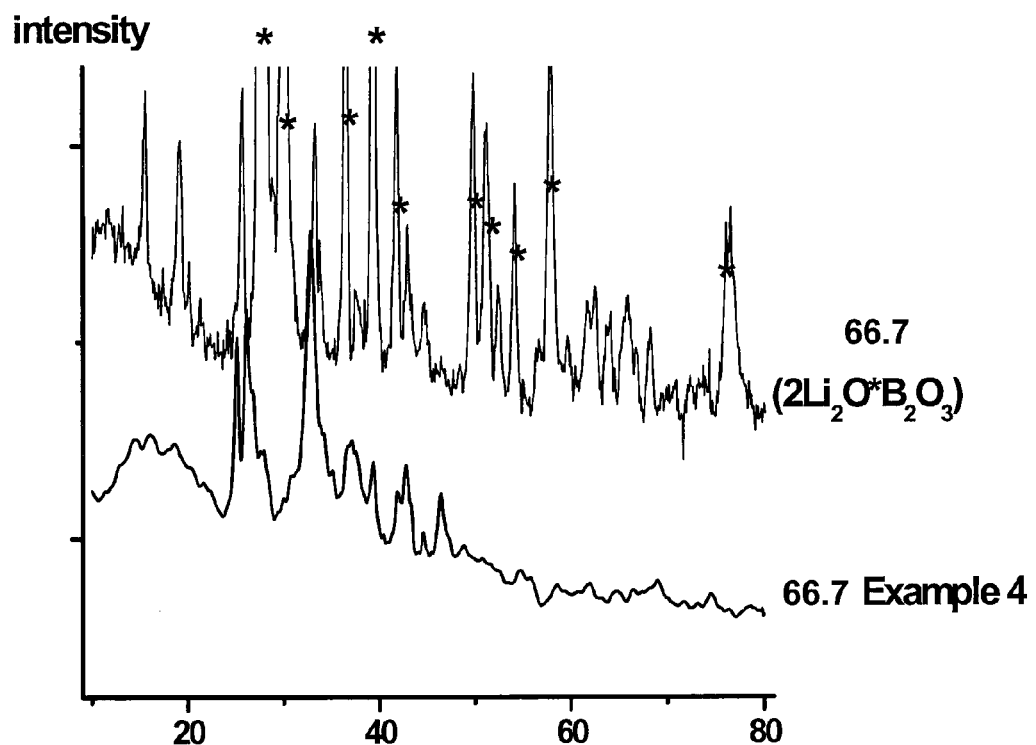
FIG. 2. X-ray patterns of the samples of solid glassy electrolytes with the thickness 1-2 mm in the system $Li_2O$—$Li_2SO_4$—$B_2O_3$, produced by the developed scheme. Content of lithium oxide is 66.7 mole. %; *–$2Li_2O \cdot B_2O_3$ (Curve1).

Glass of the composition $60L_2O \cdot 20Li_2SO_4 \cdot 20B_2O_3$ (the claimed composition, FIG. 1, curve 4). At glass batching lithium carbonate, boric acid and ammonium sulfate (chemically pure) were used. The batch was formulated per 20 g of a glass and thoroughly stirred without wetting. Glass melting was carried out at 900-950° C., mature time—0.5 h. Glass mass stirring aimed at its homogenization was made by cavitation stirring method at the frequency 22-44 kHz. The prepared mass was formed as thin flakes by rolling method through massive water-cooled rollers. By the results of R-ray phase analysis (X PA) the X-ray amorphous material has been produced. The prepared mass was formed as thin flakes by rolling method through massive water-cooled rollers. By the results of R-ray phase analysis (X PA) the flakes of the produced material were X-ray amorphous, whereas, the phase composition of the 1-2 mm thickness sample is presented, mainly by a glass phase with a small inclusions of $2Li_2O \cdot B_2O_3$ crystals (FIG. 2, #4).

Glass density was measured by the method of hydrostatic weighing of flakes in toluene. At room temperature its value was ~2.14 g/cm$^3$.

Owing to the tendency of massive glass samples to crystallization, its thermal coefficient of linear expansion was measured on the samples prepared from the wetted powders of glasses. At the expense of the partial destruction of glass particles on their surface there was formed the film bonding them in a strong sample at drying at 250° C. for 1 hour. Temperature coefficient of linear expansion is $207\cdot10^{-7}$ 1/degree (20-200° C.), dilatometric temperature of the beginning of glass softening is about 290° C.

For the SE samples of different thickness, conductivity at room temperature measured by the method of impedance spectroscopy was $31 \cdot 10^{-6}$ S·cm$^{-1}$. Electronic conductivity at 25° C. was $2.4 \cdot 10^{-12}$ S·cm$^{-1}$.

Figure 3:
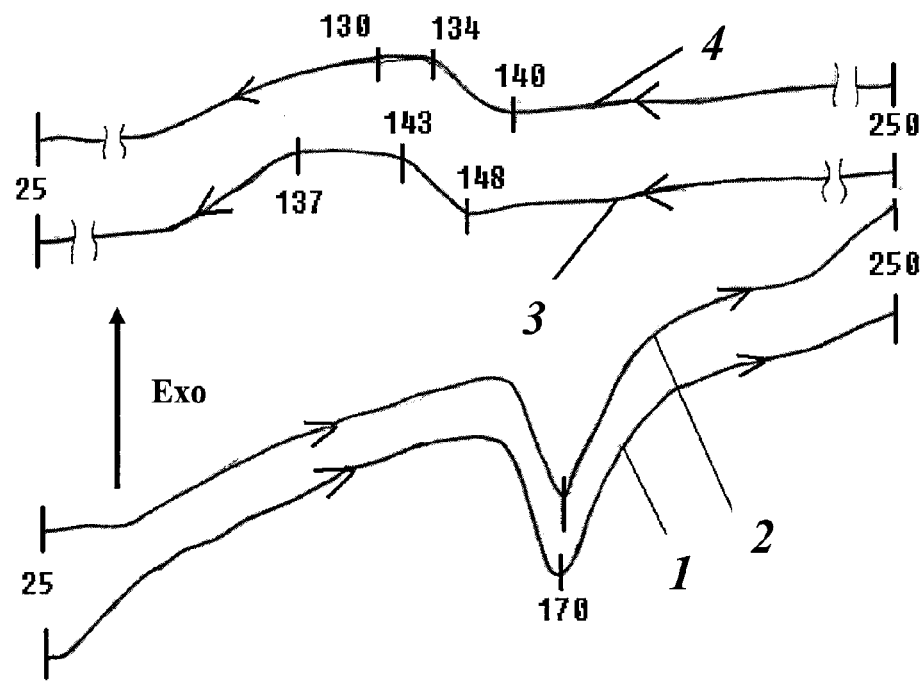
FIG. 3. Differential curves (DTA) of the system "Solid electrolyte (Example 4)—metal lithium". 1.2—first, third heating; 3.4—first, third cooling.

Glass resistance towards metal lithium was determined by DTA method. Samples for investigation were the ampoules with the mixture of glass power and metal lithium sealed in a box. At three-fold heating of the ampoules with the rate of 10 degree/min, the form and area of endo-ffect at 170° C. on DTA curves corresponding to metal lithium melting were unchanged that testified to the absence of its interaction with a glass (FIG. 3). Thus, it may be concluded, that the glass comprising $6L_2O \cdot 0.2Li_2SO_4 \cdot 0.2B_2O_3$ is resistant to metal lithium.

Example 5

Glass of $60L_2O \cdot 15Li_2SO_4 \cdot 25B_2O_3$ composition (Claimed composition). Conditions of melting and production, production methods of samples and determination methods of properties are similar to those presented in Sample 4. On the results of X-ray phase analysis, the produced glass is X-ray amorphous.

Temperature coefficient of linear expansion of material is $221 \cdot 10^{-7}$ 1/degree.

Conductivity of solid electrolyte at 25° C. is $1.43 \cdot 10^{-6}$ S·cm$^{-1}$.

On the results of DTA the glass is resistant to metal lithium (See Example 4).

Example 6

Glass of the composition $65L_2O \cdot 10Li_2SO_4 \cdot 25B_2O_3$ (Claimed composition). Conditions of melting and production, production methods of samples and determination methods of properties are similar to those presented in Sample 4. On the results of X-ray phase analysis, the produced solid electrolyte is, as a whole, X-ray amorphous.

Temperature coefficient of linear expansion of the material is $228.1 \cdot 10^{-7}$ 1/degree.

Conductivity of solid electrolyte at room temperature is $2.79 \cdot 10^{-6}$ S·cm$^{-1}$.

On the results of DTA, glass is resistant relative to metal lithium (see Example 4).

Example 7

Glass of the composition $65L_2O \cdot 15Li_2SO_4 \cdot 20B_2O_3$ (claimed composition). Conditions of melting and production, production methods of samples and determination methods of properties are similar to those presented in Sample 4. On the results of X-ray phase analysis, the produced solid electrolyte is, as a whole, X-ray amorphous.

Temperature coefficient of linear expansion of the material is $214.3 \cdot 10^{-7}$ 1/degree.

Conductivity of such SE at 25° C. is $4.9 \cdot 10^{-6}$ S·cm$^{-1}$.

On the results of DTA glass is resistant relative to metal lithium (see Example 4).

Example 8

Glass $59.55L_2O \cdot 19.85Li_2SO_4 \cdot 19.85B_2O_3 \cdot 0.75MoO_3$ (claimed composition). At glass batching, there were used lithium carbonate, boric acid, ammonium sulfate, and molybdenum (VI) oxide (chemically pure). The batch was formulated per 20 g of a glass and thoroughly stirred without wetting. Glass melting was carried out at 900-950° C., mature time—0.5 h. Glass mass stirring aimed at its homogenization was made by cavitation stirring method at the frequency 22-44 kHz. The prepared mass was formed as thin flakes by rolling method through massive water-cooled rollers. By the results of R-ray phase analysis (X PA) the X-ray amorphous material has been produced. The prepared mass was formed as thin flakes by rolling method through massive water-cooled rollers. By the results of R-ray phase analysis (X PA) both a flake and the samples were the thickness of 1-2 mm are X-ray amorphous.

Glass density was measured by the method of hydrostatic weighing of flakes in toluene. At room temperature its value was ~2.17 g/cm$^3$.

Temperature coefficient of linear expansion of glass is $211 \cdot 10^{-7}$ 1/degree, dilatometric temperature of initial glass softening is about 285° C.

For the samples of the different thickness SE conductivity at room temperature measured by the method of impedance spectroscopy was $4.3 \cdot 10^{-6}$ S·cm$^{-1}$. Electronic conductivity at 25° C. was $3.0 \cdot 10^{-13}$ S·cm$^{-1}$.

On the results of DTA the glass is resistant relative to metal lithium (see Example 4).

References

1. J. Desilvestro, O. Haas. Metal oxide cathode materials for electrochemical energy storage // J. Electrochem. Soc.—1990.—137.—c. 5C-22C.
2. Ye. I. Burmakin. Solid electrolytes with alkali metal cation conductivity—M.: Nauka, 1992.—264 p.
3. Solid-state batteries: materials design and optimization. / *Peode Eryede* Julien C. I Nazri G. A.—Kluwer Academic publishers, 1994.—625 c.
4. R. C. Acrawal, R. K. Gupta. Review supersonic solids: composite electrolyte phase—an overview // J. of Material Science.—1999.—34.—c. 1131-1162.
5. Němeč L. O strukuře borityh skel.—Silikaty, 1971, sv. 15, No 1, s. 75-97.

We claim:

1. A vitreous inorganic solid electrolyte comprising $Li_2O$, $Li_2SO_4$, and $B_2O_3$ characterized in that said electrolyte contains the above components in the following relation, mol. %: $Li_2O$—55-65; $Li_2SO_4$—10-25; $B_2O_3$—20-25.

2. A production method of the vitreous solid inorganic electrolyte including preparation of batch and its melting, characterized in that the batch is formed from lithium carbonate, ammonium sulfate, boric acid and molybdenum (VI) oxide.

3. The method of claim 2, characterized in that the batch is preliminary aged at 140 to 160° C. during 0.5 to 1 h.

4. The method of claim 2, characterized in that said melting of the solid vitreous electrolytes is carried out at 900 to 950° C. under the conditions of cavitation stirring for 20 to 40 minutes.

5. The method of claim 4 characterized in that said cavitation stirring is carried out at the frequency of 22 to 44 kHz.

6. The electrolyte of claim 1, further comprising 0.2 to 2 mass % $MoO_3$.

7. The electrolyte of claim 1, further comprising 0.6 to 2 mass % $MoO_3$.

8. The electrolyte of claim 1, further comprising 1.0 to 2 mass % $MoO_3$.

9. The electrolyte of claim 1, wherein a value of ionic conductivity of said electrolyte at a temperature of 25° C. is 1.4 to $5.6 \times 10^{-6}$ S·cm$^{-1}$ and temperature coefficient of linear expansion is $(210 \pm 20)10^{-7}$ degree$^{-1}$.

* * * * *